Oct. 15, 1957  R. W. HASSEBROEK  2,809,850
AUXILIARY BICYCLE FOOT REST
Filed Feb. 17, 1955
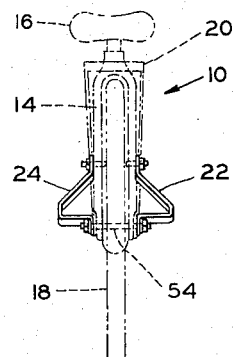
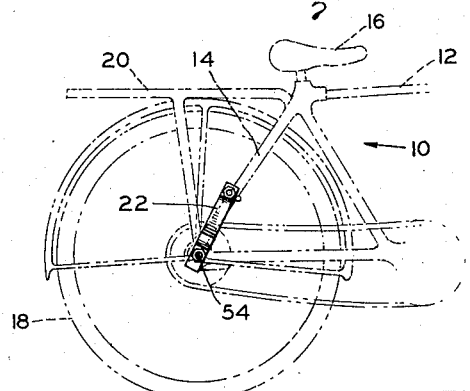
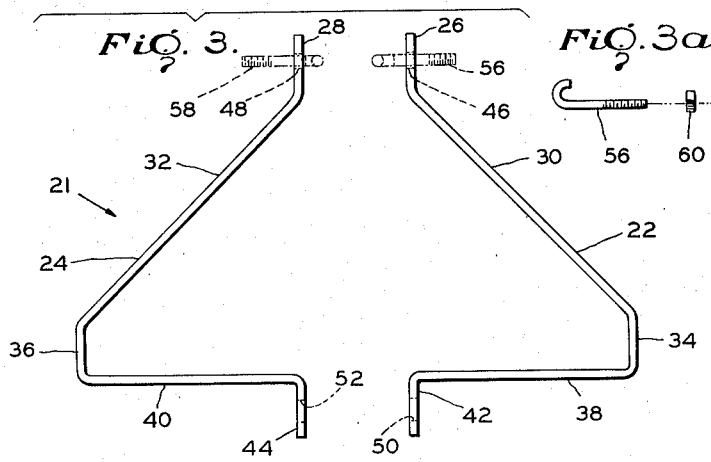
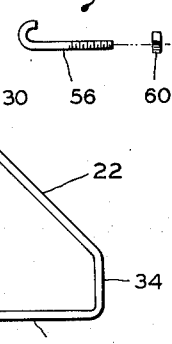
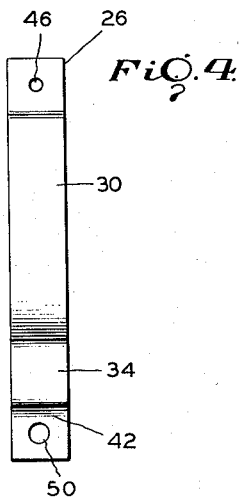
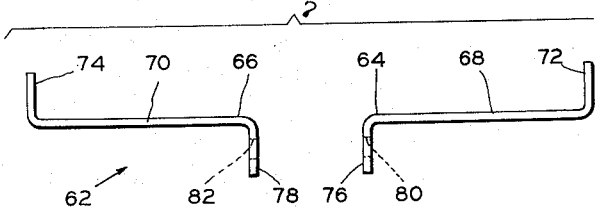
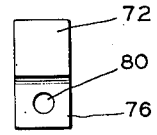
INVENTOR
Raymond W. Hassebroek.
BY Gustave Miller
ATTORNEY

United States Patent Office 2,809,850
Patented Oct. 15, 1957

2,809,850

AUXILIARY BICYCLE FOOT REST

Raymond W. Hassebroek, George, Iowa

Application February 17, 1955, Serial No. 488,964

1 Claim. (Cl. 280—291)

This invention relates to an attachment for bicycles, and it particularly relates to a foot rest adapted to be attached to a bicycle or the like for the purpose of supporting the feet of an extra passenger riding behind the operator's seat.

Ordinarily, the rear passenger who sits on the rear platform, behind the rider's seat, must allow his feet to dangle free so that, after some time, his feet become numb due to the push of blood thereto, and he becomes very uncomfortable. Furthermore, if the bicycle must come to a sudden stop or if it falls over, the extra rider has no support and is, therefore, in increased danger of injury. In addition, there is danger, while riding, that his feet may become entangled in the spokes of the rear wheel. There have been various attempts to solve these problems by providing various types of supports including foot rests, but these have, heretofore, been either too clumsy, too heavy, too expensive, and too difficult to attach; or have been of such insecure structure that they gave little support and, being easily damaged, were in constant need of repair or replacement.

It is therefore, one object of the present invention to provide a foot rest attachment for bicycles or the like which is simple in construction and easily attached to any bicycle, motorcycle or the like without the necessity of using any special tools or parts. Another object of the present invention is to provide a foot rest attachment for bicycles or the like which is strong but compact, and which may be attached by anyone without the need of any special skills.

Other objects of the present invention are to provide an improved auxiliary bicycle foot rest of the character described, that is easily and economically produced, which is sturdy in construction, and which is highly efficient in operation. With the above and related objects in view, this invention consists in the details of construction and combination of parts, as will be more fully understood from the following description, when read in conjunction with the accompanying drawing in which:

Fig. 1 is a rear elevational view of a bicycle to which a foot rest, embodying the present invention, is attached, the bicycle being shown in dotted outline and the foot rest in full line.

Fig. 2 is a fragmentary side elevational view of the device illustrated in Fig. 1.

Fig. 3 is an enlarged front elevational view of a foot rest embodying the invention.

Fig. 3a is a view showing a typical bolt used in assembling the device.

Fig. 4 is a side elevational view of one section of the foot rest of Fig. 3.

Fig. 5 is a front elevational view of an alternative embodiment of the foot rest.

Fig. 6 is a side elevational view of one of the sections of the foot rest of Fig. 5. Referring now in greater detail to the drawing wherein similar reference characters refer to similar parts, there is shown a bicycle, generally designated 10, which is provided with the ordinary type of frame 12 including a rear fork 14, a seat 16 and a rear wheel 18. The bicycle is also provided with a rear auxiliary seat or platform 20 behind the seat 16. This rear platform 20 is a common attachment which is ordinarily used either to hold baggage or packages, or to provide a seat for an additional rider.

It is for the purpose of providing a foot rest for the extra rider when he uses the seat 20 that a foot rest 21 comprising a pair of brackets 22 and 24 are attached to the bicycle frame. These brackets 22 and 24 each consists of a straight top portion or upper vertical connecting bar, as at 26 and 28, which is integral with an outwardly inclined arm or stirrup bar, as at 30 and 32, a lower straight portion or vertical brace bar, as at 34 and 36, an inwardly extending straight lateral arm or horizontal support bar, as at 38 and 40, and a depending straight portion or downwardly depending flange, as at 42 and 44. A bolt opening 46 is provided in the upper portion 26 of bracket 22 and a similar bolt opening 48 is provided in the portion 28 of bracket 24. Similar openings are provided at 50 and 52 respectively in the flanges 42 and 44. When attaching the foot rest to the bicycle, the locking nut is removed from the rear axle bolt 54 of the bicycle. The axle bolt is then removed and inserted through the opening 52 of the bracket 24. Thereafter, the axle bolt is replaced and inserted through the opening 50 of the bracket 22 on the opposite side of the rear wheel. The locking nut is then replaced and tightly secured to effect a clamping of the brackets 22 and 24 on opposite sides of the rear wheel. The upper vertical connecting bar portion of each bracket is then secured to the rear fork 14 of the bicycle frame by means of a pair of J-bolts 56 and 58. These J-bolts are inserted through openings 46 and 48 and hooked around the corresponding arm of the rear fork 14, after which locking nuts 60 are inserted onto the bolts and tightly secured to clamp the upper portions of the brackets in position. The foot rest is now in assembled position ready to be used.

In use, the rear rider places each foot on the corresponding horizontal support bars 38 and 40 of the foot rest, between that support bar and the stirrup bar 30 or 32, in the manner of a stirrup. In Figs. 5 and 6, there is shown a modified type of foot rest. This foot rest, generally designated 62, consists of a pair of brackets 64 and 66, each of which comprises a horizontal bar 68 and 70, an upstanding flange at the outer end of each bar, as at 72 and 74, and a downwardly depending flange at the inner end of each bar, as at 76 and 78. A bolt opening is provided in each depending flange, as at 80 and 82. In attaching the foot rest 62, the rear axle of the bicycle is removed as in the case of the first described foot rest, and inserted through the openings 82 and 80, on either side of the rear wheel, and then locked in position by a locking nut, in the same manner as described in the first mentioned form of the invention. There is, however, no necessity to secure the brackets at their upper ends. In using this type of foot rest, the feet of the rider are merely placed on top of the bars 68 and 70, and the flanges 72 and 74 act as lateral supports. Although this form of the invention does not provide quite as much support as the first described form, it is cheaper and easier to produce and is also easier to attach.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

An auxiliary bicycle foot support comprising a pair of brackets, each having an upper vertical connecting bar, an inclined stirrup bar and a vertical brace bar, said stirrup bar being connected at one end to said upper connecting bar and at its other end to said brace bar, and a horizontal support bar extending laterally inward from said brace bar, said support bar having a downwardly depending flange at the end opposite the brace bar, each downwardly depending flange having a bicycle axle receiving opening, each upper vertical connecting bar having a bolt hole, and a J-bolt having its shank adjustably positioned in said bolt hole by a nut, the hooked head of said J-bolt arranged to cooperate with an arm of the bicycle fork, and said flanges being secured on the bicycle axle by the axle nuts, whereby to secure said foot support fixedly on the bicycle.

References Cited in the file of this patent

UNITED STATES PATENTS

| | | |
|---|---|---|
| 1,013,007 | Fowler et al. | Dec. 26, 1911 |
| 2,575,292 | Persons | Nov. 13, 1951 |
| 2,715,033 | Fogarty et al. | Aug. 9, 1955 |

FOREIGN PATENTS

| | | |
|---|---|---|
| 67,421 | Netherlands | Feb. 15, 1951 |
| 407,496 | Italy | Oct. 17, 1944 |